Jan. 24, 1967   D. C. ROCKOLA   3,300,094
MIXING DEVICE
Original Filed Dec. 6, 1963   2 Sheets-Sheet 1
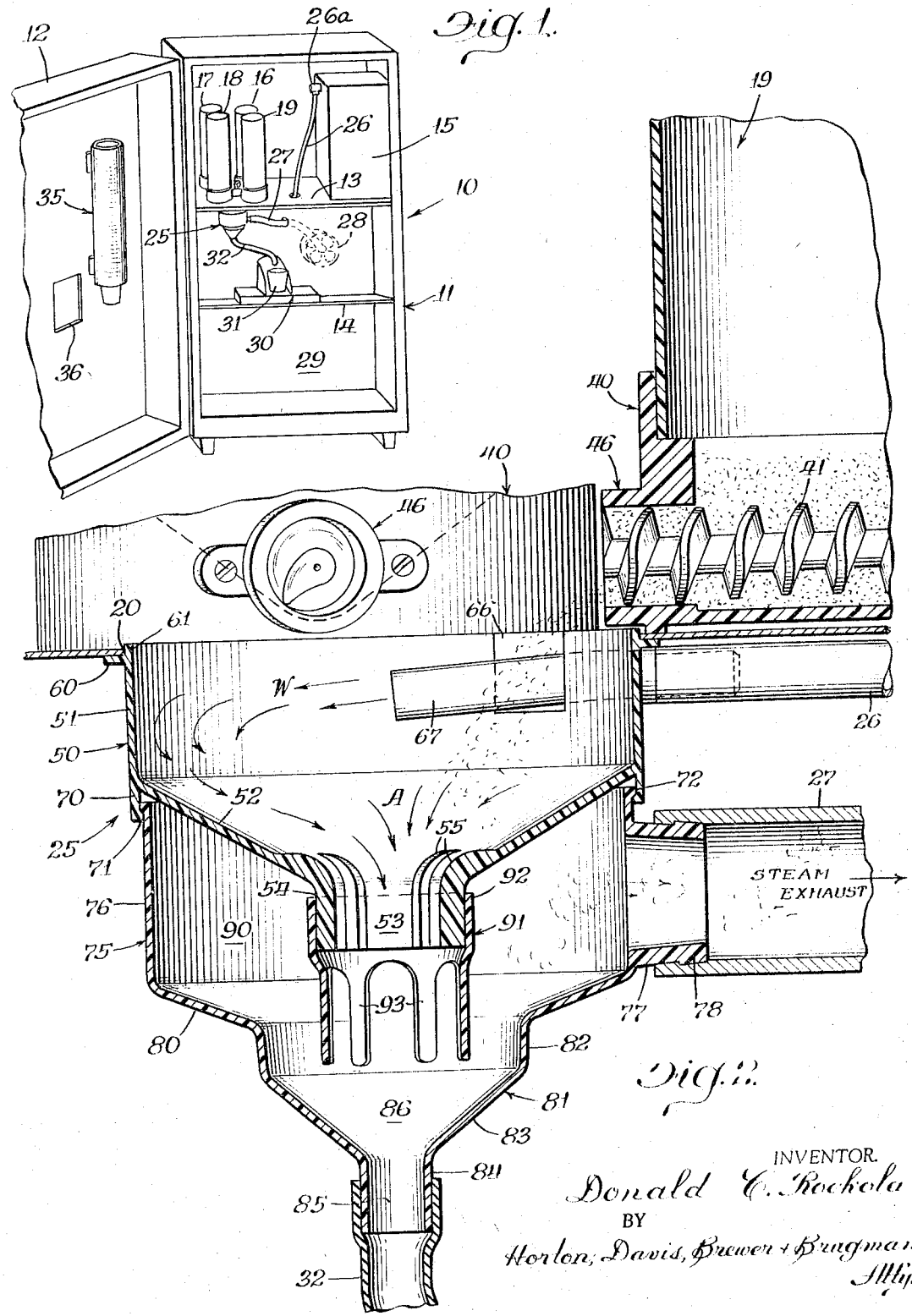
INVENTOR.
Donald C. Rockola
BY
Horton, Davis, Brewer & Brugman
Attys.

United States Patent Office 3,300,094
Patented Jan. 24, 1967

3,300,094
MIXING DEVICE
Donald C. Rockola, Chicago, Ill., assignor to Rock-Ola Manufacturing Corporation, Chicago, Ill., a corporation of Delaware
Continuation of application Ser. No. 328,691, Dec. 6, 1963. This application Nov. 23, 1965, Ser. No. 522,803
10 Claims. (Cl. 222—129.4)

This application is a continuation of my copending application Serial No. 328,691, filed December 6, 1963, now abandoned.

This invention relates generally to liquid dispensing mechanisms, particularly automatic vending machines of the type wherein powdered ingredients are admixed with liquids to form a potable food or beverage. More specifically, the present invention concerns improved means for mixing dry and liquid ingredients in such vending machines.

The vending of liquid foods and beverages by automated coin-operated machines is a familiar part of our economic society. Especially popular are coin-operated vending machines which dispense measured quantities of instant mix beverages and lisuid foods such as coffee, hot chocolate, soup and the like in which dry flavoring ingredients are admixed with a heated liquid, generally water, to fashion a desired hot drink or liquid food. In the case of coffee vending machines, for example, provision is usually made for admixing one or more dry ingredients such as powdered coffee, cream and sugar, or selected combinations thereof, with hot water to fashion hot coffee according to the customer's taste. Many times hot chocolate and hot soup mixes are similarly available from the same machine utilized for dispensing hot coffee. In any event, many of such automatic vending machines are commonly characterized by facilities for storing quantities of the dry powdered ingredients and means for dispensing measured amounts of such ingredients into some type of mixing vessels into which measured quantities of heated water also are introduced. The hot liquid and the dry ingredients are then thoroughly admixed to form a solution which is dispensed to the customer. It is especially important in this class of vending equipment that the stored powdered ingredients be maintained in a dry state to insure their free-flowing characteristics for dispensing purposes and also to obviate their contamination for hygenic reasons. The hot water employed with the dry ingredients, however, is usually introduced into the mixing vessel at temperatures sufficiently high to cause release of vapor and steam therefrom which dampen and contaminate the stored dry ingredients and generally humidify the interior atmosphere of a protective cabinet or housing containing the vending mechanism. This, of course, is highly undesirable since it dampens the dry ingredients, preventing their free flow, causes the same to cake and harden and even in some instances spoil, to say nothing of the resulting damage to the vending machinery due to rust, etc. While various schemes and devices have been presented prior to this invention in an effort to overcome the above-outlined difficulty, such have not been fully satisfactory.

The present invention concerns improved means for intermixing liquid and dry ingredients in such a manner and under such controls as to substantially obviate the above-outlined problem in the vending machine art. In brief, the present invention is embodied in an improved mixing device comprising a generally open vessel or receptacle into which dry and liquid ingredients are freely introduced in measured quantities and from which such ingredients are rapidly discharged by the combined forces of gravity and air so as to substantially avoid the release of contaminating vapors and steam to the surrounding atmosphere, particularly the atmosphere about or adjacent the areas in which the dry ingredients are stored. The means for controlling the movement and discharge of the ingredients from the open vessel also effectively prevent unwanted movement of fine powders or dust from the dry ingredients into the atmosphere about such vessel. The ingredients discharged from the open vessel are thereafter introduced into an adjacent enclosed receptacle and maintained in intimate relation therein for a controlled time interval sufficient to effect homogenous solution thereof. The latter receptacle communicates openly with a contiguous chamber constituting a steam trap so that vapor and steam released by the hot liquid are efficiently captured in the trap. Suitable means are coupled to the trap, including forced air exhaust means for circulating air through the steam trap whereby the vapors and moisture therein are effectively discharged to a remote area and atmosphere, located generally outside of the cabinet or enclosure in which the vending mechanism associated with the mixing device of this invention is installed.

Thus, the humid vapors and steam released by hot liquid during the mixing and vending cycles are effectively prevented from contaminating and humidifying the interior atmosphere of an associated vending machine and are particularly barred from the areas in which the dry ingredients are stored. Advantageously the controlled movements of the ingredients effected according to this invention, which include not only the controlled movements of the liquid ingredients but the dry powdered ingredients as well, substantially prevent the caking or coating of the cabinet's interior and associated vending mechanisms with powdered ingredients, thus promoting general hygenic conditions and operating efficiency for vending machinery.

The main object of the present invention is to provide a new and improved device for intermixing dry and liquid ingredients.

Another important object of this invention is to provide an improved mixing device, as aforesaid, which includes means for effectively preventing the escape of liquid vaporous and dry ingredient particles to the surrounding atmosphere.

A still further object of this invention is to provide a new and improved mixing device receptive of liquid and dry powdered ingredients and including means for controlling the gravitational flow and movement of such ingredients in a manner to insure a homogenous solution thereof.

A still further important object of this invention is to provide a new and improved mixing device for automatic vending machines of the class in which hot liquid and dry powdered ingredients are introduced into a mixing receptacle, the liquid being at elevated temperatures sufficient to release steam therefrom in the presence of ambient conditions and which includes an effective steam trap operative to capture the steam and vapors released by the hot liquid.

Still another object of this invention is to provide a new and improved mixing device, as aforesaid, which utilizes the combined forces of gravity and moving air to control the movement of liquid and dry ingredients from one receptacle into another and which further utilizes the moving air to remove steam and vapors released by the hot liquid during its admixture with the dry ingredients.

Having thus described the present invention, the best mode presently contemplated for practicing and carrying out its teachings will now be described in conjunction with a preferred embodiment thereof illustrated in the accompanying drawings.

In the drawings:

FIGURE 1 is a perspective view of an automatic vending machine and illustrating the embodiment of the present invention therein;

FIGURE 2 is an enlarged front elevational view, with portions thereof in cross-section and other portions thereof in full elevation, showing the structural arrangement and relationship of elements embodied in the mixing device of this invention.

Figure 3:
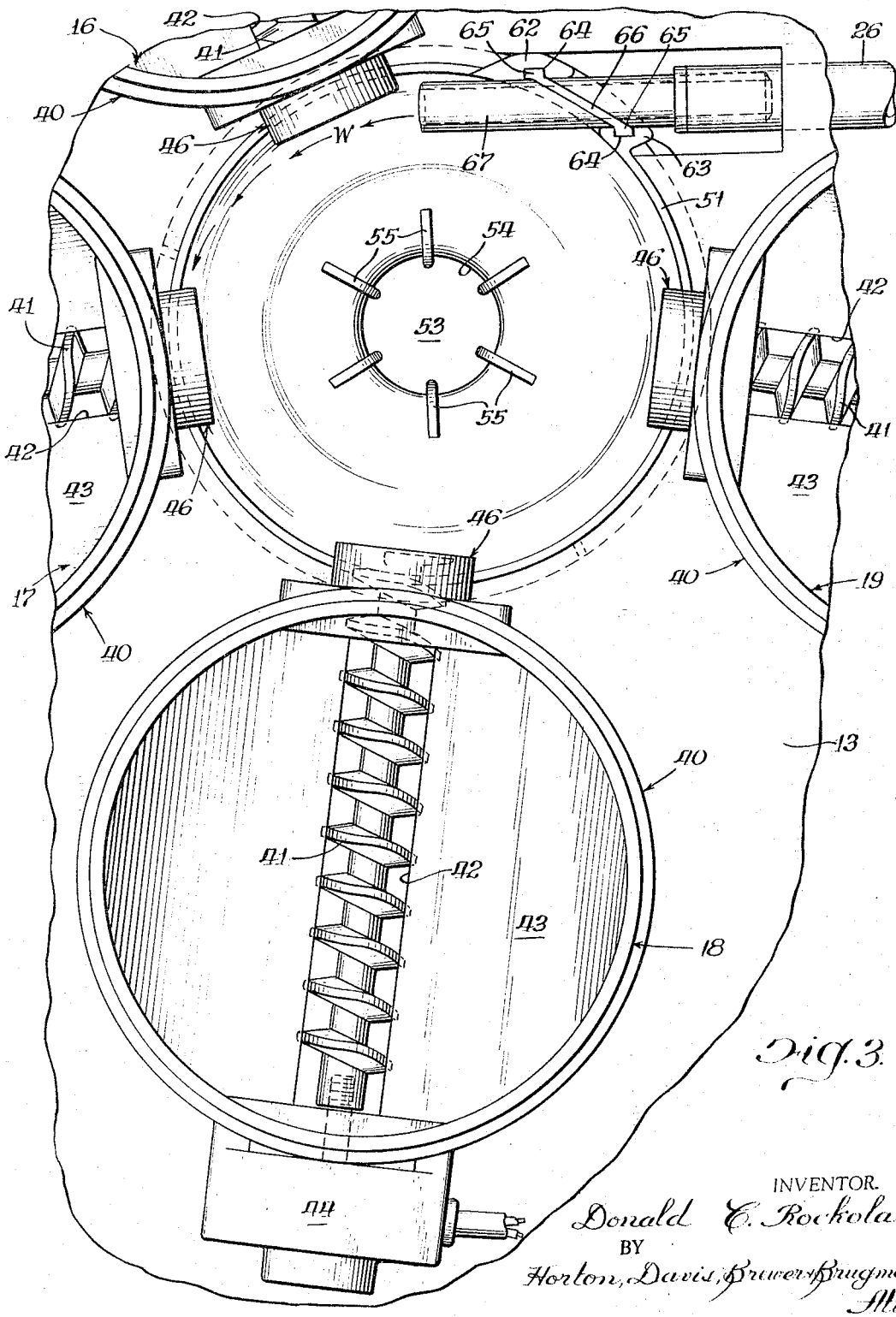
FIGURE 3 is a top plan view of the mixing device seen in FIGURE 2 and illustrating the relationship of the dry ingredient storage means therewith.

Turning now to the features of the present invention as found in the embodiment thereof illustrated in the drawings, it will be recognized by those skilled in the art that an automatic vending machine of the general order to which the present invention is adapted is indicated generally at 10 in FIGURE 1. As shown in that figure, the vending machine 10 comprises a generally rectangular cabinet 11 having a front opening door 12 hinge mounted in a manner to provide ready access to various mechanisms housed within the cabinet 11. As shown, the cabinet typically encloses one or more horizontal support shelves 13 and 14 on which are mounted various elements of the vending machinery. For the purpose of the present description, only those elements essential to an understanding of the present invention are shown in FIGURE 1; it being understood that other mechanisms and means not directly pertaining to the present invention are normally housed within the vending machine cabinet to present a fully automated vending machine according to recognized practice. In any event, as illustrated in FIGURE 1, cabinet 11 encloses and supports a tank 15 for storing a source of hot water or other heated mixing liquid; such tank being illustrated as mounted on top of the upper shelf 13. To one side of tank 15 on shelf 13 are mounted a plurality of dry ingredient storage means comprising cannisters or containers, indicated generally by numerals 16–19, and arranged about a central opening 20 formed through shelf 13 (see FIGURE 2). Disposed contiguously beneath the opening 20 is the improved mixing device 25 of this invention which will be described in greater detail presently.

The mixing device 25 is coupled to the liquid storage tank 15 by a hot liquid carrying conduit means 26, with flow of liquid therethrough being controlled by valve means 26a usually electrically operated by remote control means (not illustrated). The mixing device 25 is also coupled to a flexible conduit means 27 leading to an exhaust fan or blower means 28 mounted on the exterior of rear wall 29 for the cabinet 11. A vending station 30 is shown generally beneath mixing device 25 on shelf 14 to support drinking cups 31. Cups at vending station 30 are filled with liquid discharged from the mixing device 25 by means of flexible discharge tubing or conduit 32. A cup dispensing means 35 is schematically indicated in FIGURE 1, mounted on the inner face of door 12 to supply cups to the vending station 30; it being understood that cups 31 are conventionally deposited at station 30 in response to coin-initiated vending mechanisms, not shown, but well known to those versed in this art. A suitable access opening 36 is also provided in door 12 to enable the customer to extract a filled cup from station 30 at the end of a vending cycle.

Having thus described the general environment in which the present invention finds utility, the particulars thereof, as illustrated in FIGURES 2 and 3 of the drawings, will now be described.

As seen in these figures, each of the dry ingredient storage means of cannisters 16–19 comprises a generally cylindrical bin member mounted in a supporting base 40 which is fixed to shelf 13 and includes a dry ingredient dispensing means adapted to dispense measured amounts of the dry ingredients into the mixing device 25. The dry ingredient dispensing means typically comprises an auger device 41 rotatably mounted in an open channel 42 formed across a funnel-like hopper bottom 43 for the supporting base. The auger 41 is periodically driven by an electric motor means 44 energized in accordance with vend initiating and vend cycle control means (not shown) generally responsive to the deposit of a preselected coin value by the customer, according to conventional practice.

Typically, each of the cannisters 16–19 is filled with a different or individual dry ingredient. For instance, in a vending machine adapted to dispense both hot coffee and hot chocolate, cannister 16 may store powdered coffee, cannister 17 sugar, cannister 18 powdered cream and cannister 19 powdered hot chocolate mix. In accordance with the selected combination of ingredients desired by the customer, one or more of the dispensing auger means 41 may be rotatably actuated for selected time intervals per vending cycle to dispense measured amounts of the dry or powdered ingredients directly into the mixing device 25. Thus, for instance, if the customer desired hot coffee with cream and sugar, the dispensing means associated with each of the cannisters 16, 17 and 18 would be actuated in the above described example. If hot chocolate were desired, only the dispensing means associated with storage means 19 would be operated. Similarly, if black coffee were desired, only the dispensing means for storage means 16 would be operated, all according to known practice.

In order to insure deposit of the dry ingredients into the mixing device 25, each of the auger means extends into an open-ended cylindrical discharge portion 46 formed on base 40, to extend inwardly of the periphery for opening 20 (see FIGURE 3). Thus, upon rotation of each of the auger means, dry ingredients are discharged from the open end of the associated discharge portion 46 to fall gravitationally downward through opening 20 directly into the improved mixing device 25, which will now be described in detail.

As seen best in FIGURE 2 of the drawings, the improved mixing device or means 25 of this invention comprises a unitary, open-topped upper receptacle member 50 of general funnel shape, formed by a cylindrical side wall portion 51 merged integrally with a frusto-conical bottom wall portion 52 provided with a central discharge outlet or opening 53 defined by a depending cylindrical throat portion 54 (see FIGURE 3). A plurality of circumferentially spaced, rib-like projections 55 protrude inwardly of the internal periphery of the discharge opening 53 as well as the interior face of the frusto-conical bottom wall portion 52. These ribs 55 constitute flow control means for directing liquid and powdered ingredients downwardly from the interior of receptacle 50 into the central discharge opening or outlet 53. Such ribs 55 also dampen the free flow of the ingredients to discourage the same from swirling about the interior of receptacle 50 for any extended time, as will be amplified in greater particular hereinafter.

The receptacle 50 and, more particularly, the cylindrical side wall 51 thereof, is formed with an annular, radially outward extending flange portion 60 adjacent its upper end so as to provide an upwardly extending annular lip portion 61 at its very upper limits. The lip portion 61 is adapted to be axially inserted tightly into opening 20 in shelf 13, such insertion being limited by flange 60. This arrangement provides a convenient way of mounting the mixing device and, more particularly, for locating the receptacle 50 in operating position directly in line with and beneath opening 20 and the overdisposed dry ingredient discharge portions 46.

The side wall portion 51 is also provided at one side with a pair of circumferentially spaced mounting lugs 62, 63 (see FIGURE 3), each of which extends radially outwardly of the external periphery of wall 51. The mounting lugs 62, 63 are formed to provide a pair of parallel opposed keyway slots or channels 64, 64 each receptive of one of a pair of mating key projections 65 formed integrally with and along opposite sides of a mounting block 66 substantially projecting from the exterior of rigid water inlet tube 67. The water inlet tube 67 is preferably of a molded plastic material related and aligned with mounting block 66 in such a fashion as to direct liquid discharged from the inlet tube substantially tangentially over the interior side walls or face of the cylindrical wall portion for the upper receptacle member 50. This relationship is best seen in FIGURE 3 from which it will be readily recognized that the inlet tube 67 is coupled to the previously mentioned hot water supply conduit 26. This mounting arrangement provides an easy and convenient means for readily disassociating the water supply conduit 26 from the mixing device 25 for servicing the machine while insuring that water is introduced into the interior of receptacle 50 in a substantially tangential relationship with the interior walls thereof, as indicated by arrows W in FIGURES 2 and 3.

In addition to the annular flange portion 60 and the upper lip portion 61 above described, the side wall portion 51 of the upper receptacle 50 is also formed to include a lower annular skirt portion 70 which extends below or beyond the junction of the cylindrical side wall portion 51 and the frusto-conical bottom wall portion 52. This relation is best shown in FIGURE 2. The skirt portion 70 is provided with a radially inwardly directed bead 71 adjacent its lower edge, which is adapted to interlockingly engage a corresponding annular locking bead 72 formed externally about the upper end of a lower receptacle 75 for the mixing device.

The lower receptacle 75 also constitutes a substantially funnel-shaped member including an upper cylindrical wall portion 76 having the locking bead 72 formed at its upper end and distinguished by an enlarged steam and vapor exhaust outlet means 77 formed as a substantially cylindrical projection extending outwardly of one side thereof, as shown in FIGURE 2. The outlet means 77 is slightly tapered toward its outer end to receive the exhaust conduit 27 thereover and the same preferably includes an annular locking projection or lip 78 formed about its exterior which is adapted to penetrate the internal walls of the exhaust conduit 27 to maintain the latter tightly fitted over the exhaust outlet means 77. In this respect, whereas the outlet means is preferably of a rigid, substantially non-deformable material, conduit 27 is preferably of a relatively pliable plastic material, such as soft nylon tubing.

The cylindrical side wall portion 76 of the lower receptacle 75 is integrally formed at its lower end with a frusto-conical wall portion 80 which, in turn, is merged integrally with a funnel-shaped mixing bowl portion indicated generally at 81. Mixing bowl 81 is made up of an upper cylindrical wall portion 82, a lower frusto-conical wall portion 83 and a central depending cylindrical outlet portion 84 defining a discharge outlet 85 communicating openly with this interior of the mixing bowl. The discharge portion 84 is adapted to receive one end of the discharge tube or conduit 32 whereby to discharge liquids intermixed in mixing chamber 86 of the mixing bowl directly into the conduit 32 which leads to the dispensing station 30.

As will be recognized from examining FIGURE 2 in particular, it will be appreciated that the upper receptacle 50 and the lower receptacle 75 are coaxially interfitted to dispose the respective discharge outlets 53 and 85 thereof in coaxial alignment. As a consequence, the wall portion 80 of the lower receptacle 75, together with the bottom wall portion 52 of the upper receptacle 50 thereby enclose a substantially annular chamber 90 surrounding the depending discharge portion 54 of the upper receptacle. Chamber 90 is in direct communication with the steam and vapor exhaust outlet 77. Chamber 90 serves as an effective steam and vapor trap for accumulating vaporous particles released by the hot liquid, as will be described in greater detail presently.

Chamber 90 is further separated from the liquid and dry ingredients discharge through outlet 53 of the upper receptacle by a flow control gate member indicated generally at 91 in FIGURE 2. The flow control gate, as shown in that figure, constitutes a generally cylindrical tubular member having a cylindrical upper wall portion 92 adapted to fit externally about the depending cylindrical discharge portion 54 for the upper receptacle. Such cylindrical wall portion 92 is also formed integrally with a plurality of spaced, depending finger portions 93 which depend therebelow and extend into the upper end of mixing chamber 86, as defined by the mixing bowl portion 81. Fingers 93 serve, in operation, to deflect ingredients discharged from the upper receptacle directly into the mixing chamber 86 while substantially preventing lateral movement thereof into the steam trap chamber 90.

Having thus described the structural features of the improved mixing device 25 of this invention, its unique operational aspects will now be described. Upon initiating a vending cycle, one or more of the powdered ingredients stored in the canisters 16-19 are automatically discharged in measured amounts directly in the open top upper receptacle 50 of the mixing device. The water control valve means 27 also is scheduled for operation in such a fashion as to introduce measured quantities of heated water into the interior of receptacle 50 just prior to the discharge of powdered ingredients. As the water enters receptacle 50, the same swirls tangentially about the interior side walls thereof, wetting the same so that the powdered ingredients are generally discharged directly into a moving water stream to prevent their sticking or adhering to the side walls of receptacle 50. As it is desirable, according to the present invention, to prevent the water and dry ingredients from remaining in the upper receptacle for any appreciable length of time, the discharge outlet 53 of the upper receptacle 50 is purposely large in diameter. To assist the rapid entry of the liquid and dry ingredients into the discharge opening 53, the flow control veins or ribs 55 are provided to break up the normal tendency of the liquid to swirl about and over the funnel-like interior walls of receptacle 50; the ribs 55 thereby assisting the rapid downward discharge of the ingredients through opening 53, and the flow gate 91 directs the same into the mixing chamber 86 of the lower receptacle 75.

It is to be noted with respect to the foregoing described events that the forced air exhaust means communicating with the steam trap chamber 90, comprising the exhaust fan 28 and conduit 27, may be operated either continuously or periodically. In either event, however, the exhaust fan 28 should be energized for operation either just prior to or simultaneously with the commencement of the vending cycle and, more particularly, prior to the discharge of the hot liquid and dry ingredients into the upper receptacle 50. Thus, it will be understood that the fan 28 places a suction on the interior of the lower receptacle 75, causing air to be drawn downwardly through the discharge opening 53 of the upper receptacle, as indicated by arrows A in FIGURE 2. There is also a slight updraft of air through the discharge outlet 85 and conduit 32, but due to the marked difference in diameters between the discharge outlets 53 and 85 of the upper and lower receptacles, respectively, substantially in the ratio of 2:1, the major air supply to fan 28 is furnished through the larger upper discharge opening 53. This downdraft of air materially assists normal gravity forces in rapidly drawing and discharging liquid and powdered ingredients from the upper receptacle 50 into the lower receptacle 75. Due to such rapid discharge from the upper receptacle, very little, if any, vapor and steam are released by the hot liquid while the same is in the upper receptacle, thereby maintaining the atmosphere above the mixing device generally free of the damaging effects of rising steam and vapor particles. Similarly, any dust or fine particles of the dry ingredients, normally released when such are discharged into an open receptacle, such as the upper receptacle 50, are likewise substantially prevented from escaping into the atmosphere surrounding or about receptacle 50 since the same also are drawn with the moving air downwardly through the discharge opening 53.

It is to be noted that a partial intermixing of the liquid and powdered ingredients takes place in the upper receptacle, even through such ingredients come into contact in that receptacle only briefly. However, such premixing is not of sufficient duration to effect a desired potable solution for vending purposes.

A thorough intermixture of the liquid and dry ingredients is carried out successfully, however, in the mixing bowl chamber 86 of the lower receptacle, whereat such materials are maintained in intimate contact for a substantial interval of time. That is to say, whereas the ingredients are discharged rapidly from the upper receptacle, their discharge from the mixing bowl of the lower receptacle is purposely controlled to a much slower rate. This is brought about by the substantial reduction in the diameter for the discharge outlet means or opening 86 leading from the mixing bowl portion 81 in relation to the diameter of discharge opening 53 which supplies ingredients to the mixing chamber. As above indicated, it has been found that the ratio of diameters between discharge openings 53 and 85 may be substantially in the order of 2:1 for satisfactory operation in vending hot coffee and liquids of a similar viscosity.

As the ingredients enter the mixing bowl chamber 86 of the lower receptacle, the discharge outlet 85 thereof is rapidly sealed over by the liquid to thereby effectively valve off any updraft of air flowing through discharge opening 85. The air flow through the upper discharge opening 53 is thereby slightly increased during the mixing stage when the ingredients swirl about the funnel-like interior of the mixing bowl chamber 86, thoroughly intermixing and dissolving the powdered ingredients in the hot liquid.

During this mixing stage or interval the hot liquid is prone to release steam and vaporous particles which rise upwardly therefrom into the annular steam trap chamber 90. Steam and vaporous particles captured in the trap 90 are rapidly withdrawn therefrom by the sucking activity of the exhaust fan 28 which, as above noted, discharges externally of the cabinet 11 to achieve the desired objective of maintaining the interior atmosphere of the cabinet substantially free from humid vapors, etc.

From the foregoing description it is believed that those familiar with the art will readily recognize and appreciate the unique features of the present invention which mark the same as an advancement and improvement over the prior art. It will be particularly appreciated that the unique arrangement of the forced air exhaust system and the steam or vapor trap, coupled with the means for controlling the flow and movement and mixing of liquid and dry ingredients, according to the present invention, provide uniquely improved means for controlling the interior atmosphere of a vending machine so as to maintain such interior substantially free of the undesired and damaging effects of powdered ingredients and vaporous particles. Further, while the present invention has hereinabove been described in association with a particular preferred embodiment thereof illustrated in the accompanying drawings, those cognizant with this art will readily appreciate that such embodiment is nevertheless susceptible to numerous changes, modifications and substitutions of equivalents without departing from the spirit and scope of the present invention. Consequently it is intended that the herein disclosed invention be unlimited by the foregoing, except as may appear in the following appended claims.

I claim:

1. In a beverage vending machine having means for discharging measured amounts of liquid and dry beverage forming ingredients, a mixing device comprising an open top upper receptacle receptive of both liquid and dry beverage forming ingredients from said discharging means to mix the same, an open top lower receptacle coaxially interfitted with and having its open top over-covered by the upper receptacle to enclose therewithin a mixing chamber in the lower end thereof and a steam trap chamber adjacently above said mixing chamber; said upper and lower receptacles each having a gravity discharge opening at its lower end; the said opening of the said upper receptacle communicating directly with the mixing chamber in said lower receptacle to deposit mixed ingredients therein; and forced air circulating means including conduit means communicating with said steam trap chamber and a discharge outlet remote of said mixing device and operating to exhaust the atmosphere of said steam trap chamber and circulate air downwardly through the discharge opening of said upper receptacle and through the mixing chamber of said lower receptacle whereby vaporous and dry particles released by said ingredients are effectively removed from said steam trap chamber and the atmosphere about said mixing device.

2. In a beverage vending machine, a mixing device for intermixing liquid and dry beverage forming ingredients comprising, an upper receptacle, means for periodically introducing both liquid and dry beverage forming ingredients into said upper receptacle whereat the same are mixed, a lower receptacle interfitted with said upper receptacle and having a lower mixing chamber and a steam trap chamber located above and openly communicating with said mixing chamber, said upper and lower receptacles each having a central discharge opening in the lower end thereof; the said opening of said upper receptacle being located within the interior of said lower receptacle and communicating directly with said mixing chamber and being substantially larger than the said opening of said lower receptacle whereby ingredients mixed in said upper receptacle are rapidly discharged therefrom and deposited in said mixing chamber and maintained in the latter for a time interval sufficient for the homogeneous intermixture thereof; and forced air circulating means communicating with said steam trap chamber and a discharge outlet remote of said mixing device, said circulating means being operative to exhaust the atmosphere of said steam trap chamber and circulate air downwardly through the discharge opening of said upper receptacle whereby vaporous and dry particles released by said ingredients are effectively removed from said steam trap chamber and the atmosphere about said mixing device.

3. In a beverage vending machine, a mixing device for intermixing liquid and dry beverage forming ingredients comprising an open receptacle, means for periodically introducing said liquid and dry beverage forming ingredients into said open receptacle, an enclosed receptacle coaxially interfitted with and disposed beneath said open receptacle, said open receptacle receiving and mixing said ingredients received from said introducing means and having a gravity discharge outlet means at its lower end communicating with the interior of said enclosed receptacle; said enclosed receptacle including a mixing chamber in the lower interior thereof receptive of mixed ingredients discharged from said open receptacle, a trap chamber located contiguously above and openly communicating with said mixing chamber, and discharge means including a discharge outlet communicating with said mixing chamber for discharging mixed beverages therefrom; and means for exhausting the atmosphere from the interior of said enclosed receptacle and from the area about and within the mixing device, including a conduit communicating with said trap chamber and circulating means communicably connected with said conduit and adapted to circulate atmosphere therethrough and discharge the same remotely of the mixing device; the said discharge outlet means of said open receptacle providing the primary intake for admitting atmosphere to said circulating means whereby vapor and dry ingredient particles in the atmosphere about and within said mixing device are drawn through said trap chamber.

4. In a beverage vending machine, a source of heated liquid, a source of dry powdered beverage flavoring ingredient, a mixing device for intermixing heated liquid and dry ingredients to form a beverage therefrom, means for discharging measured amounts of said liquid and dry ingredients into said mixing device, and means for withdrawing heat and steam from the atmosphere about said mixing device and for preventing contamination of the source of dry ingredients thereby; said mixing device comprising an open top funnel-shaped receptacle to receive said liquid and dry ingredients from said discharging means and mix the same and having ingredient discharge outlet means at the lower end thereof, an enclosed funnel-shaped receptacle interconnected coaxially beneath said open receptacle and surrounding said outlet means of the latter to provide a mixing chamber and, coextensively thereover, a steam trap chamber within the interior of said enclosed receptacle, said mixing chamber being receptive of mixed ingredients discharged from said open receptacle and said steam trap chamber communicating openly with the upper end of said mixing chamber whereby vapor and flavoring ingredient particles released into the atmosphere by said ingredients in said mixing chamber are effectively collected in the overdisposed said steam trap chamber; said means for withdrawing heat and steam comprising conduit means communicating with and between said steam trap chamber and a remote discharge outlet, and an air circulating device connected with said conduit means to force circulate air through the latter and said steam trap chamber thereby to exhaust the atmosphere therein remotely of said mixing device, said air circulating means also serving to draw the atmosphere about said open receptacle downwardly through said discharge outlet means thereof and through said steam trap chamber.

5. The combination as set forth in claim 4 wherein said discharge outlet means comprises an enlarged opening having associated means in said open receptacle and means extending into said enclosed receptacle for effectively controlling the flow of liquid and dry ingredients in said open receptacle to minimize the circulation thereof about the interior of said open receptacle and for directing the same directly into said mixing chamber of said enclosed receptacle, whereby to minimize the release of heat, steam and powder particles from the ingredients in said open receptacle.

6. In a beverage vending machine, a device for intermixing hot liquid and dry beverage forming ingredients comprising an upper receptacle having an open top and a lower discharge opening, a lower receptacle having an open top and a lower discharge opening, means supporting the lower receptacle adjacently beneath the upper receptacle whereby the open top of the lower receptacle is covered over by the upper receptacle to form a substantially enclosed chamber within the lower receptacle, means for introducing dry beverage forming ingredients into the upper receptacle, means for introducing hot liquid into the upper receptacle for mixing with said dry ingredients, and means communicating with the interior of the lower receptacle for exhausting the atmosphere of the said chamber therewithin.

7. An improved mixing device for intermixing liquid and dry ingredients comprising a vessel having a pair of superposed interconnected funnel-like portions aligned about a common vertical axis and comprising an upper receptacle having an open upper end and, therebeneath, a lower receptacle substantially enclosed by said upper receptacle and having a mixing chamber at the lower end thereof and a substantially annular steam trap chamber adjacently above said mixing chamber; means for supplying said upper receptacle with liquid and dry ingredients to be mixed, said upper receptacle having discharge outlet means disposed centrally of its lower end and located within the interior of said lower receptacle for the gravitational discharge of such ingredients directly into the said mixing chamber; discharge outlet means provided centrally of the lower end of said lower receptacle and mixing chamber in coaxial alignment with the discharge outlet means of said upper receptacle, the said discharge outlet means of said upper receptacle being enlarged and having sufficient ingredient carrying capacity whereby said ingredients are rapidly discharged from said upper receptacle, the ingredient carrying capacity of said outlet means for said lower receptacle being substantially less than said capacity of the outlet means for said upper receptacle so as to maintain the ingredients in intimate contact in said mixing chamber for a sufficient length of time to insure homogeneous intermixing thereof; means communicating with said steam trap chamber including forced air circulating means for exhausting the atmosphere of that said chamber and creating a downdraft of air through the said discharge outlet means of said upper receptacle, said downdraft of air serving to materially assist the gravitational discharge of ingredients from said upper receptacle into said mixing chamber, each of said funnel-like portions comprising a discrete unitary member of substantially frustro conical formation, means detachably interconnecting said members in coaxial relationship, and mounting means associated with the uppermost of said two members for supporting the lowermost of said members.

8. In a beverage vending machine, a mixing device for intermixing liquid and dry beverage forming ingredients comprising an upper receptacle having an open top and a lower discharge opening, a lower receptacle having an open top and a lower discharge opening, means supporting the lower receptacle adjacent the upper receptacle whereby the latter covers the open top of the lower receptacle to substantially enclose a chamber therewithin which receives ingredients discharged from said upper receptacle, means for introducing dry beverage forming ingredients into the upper receptacle, means for introducing liquid into the upper receptacle for mixing with the dry ingredients, and means communicating with the interior of said lower receptacle for exhausting the atmosphere of said chamber.

9. A device as defined in claim 6 wherein the discharge opening of the upper receptacle is larger than the discharge opening of the lower receptacle whereby ingredients introduced into the upper receptacle are rapidly discharged therefrom into the lower receptacle at a rate substantially exceeding the rate at which the mixed ingredients are discharged from the lower receptacle to thereby maintain the ingredients in the lower receptacle for a time interval sufficient for the homogeneous mixture thereof.

10. A device as defined in claim 6 wherein the means for exhausting said chamber comprises a conduit communicating therewith and an air circulating fan communicating with said conduit and having a discharge outlet remote from the receptacles whereby heat, vapor and dry particles released into the atmosphere by said ingredients are effectively removed from the atmosphere about and within the mixing device.

References Cited by the Examiner

UNITED STATES PATENTS

| 2,800,152 | 7/1957 | Sloier | 222—129.4 X |
| 2,843,293 | 7/1958 | Burgoyne | 222—129.4 |
| 3,193,143 | 7/1965 | Maieli | 222—129.4 X |

FOREIGN PATENTS

| 615,915 | 3/1961 | Canada. |

ROBERT B. REEVES, *Primary Examiner.*

F. R. HANDREN, *Assistant Examiner.*